United States Patent [19]

Kashiwamura et al.

[11] Patent Number: 4,655,505
[45] Date of Patent: Apr. 7, 1987

[54] PNEUMATICALLY CONTROLLED SEAT FOR VEHICLE

[75] Inventors: Takayoshi Kashiwamura; Ryoichi Iwasaki, both of Kawasaki, Japan

[73] Assignee: NHK Spring Co., Ltd., Japan

[21] Appl. No.: 798,896

[22] Filed: Nov. 18, 1985

[30] Foreign Application Priority Data

Dec. 13, 1984 [JP] Japan .................. 59-264319
Feb. 7, 1985 [JP] Japan .................. 60-022497
Apr. 15, 1985 [JP] Japan .................. 60-079499
Jun. 20, 1985 [JP] Japan .................. 60-134838

[51] Int. Cl.$^4$ .......................... A47C 7/46; B60N 1/06
[52] U.S. Cl. ..................... 297/284; 297/330; 297/DIG. 3
[58] Field of Search ............... 297/284, 330, DIG. 3

[56] References Cited

U.S. PATENT DOCUMENTS

| | | | |
|---|---|---|---|
| 3,867,732 | 2/1975 | Morrell | 297/DIG. 3 X |
| 4,190,286 | 2/1980 | Bentley | 297/DIG. 3 X |
| 4,467,252 | 8/1984 | Takeda et al. | 297/330 X |
| 4,552,402 | 11/1985 | Huber et al. | 297/DIG. 3 X |

FOREIGN PATENT DOCUMENTS

| | | | |
|---|---|---|---|
| 2746630 | 4/1979 | Fed. Rep. of Germany | 297/330 |
| 2912755 | 10/1980 | Fed. Rep. of Germany | 297/330 |
| 2536975 | 6/1984 | France | 297/DIG. 3 |
| 138024 | 10/1981 | Japan | 297/330 |
| 206426 | 12/1983 | Japan | 297/330 |

Primary Examiner—Kenneth J. Dorner
Assistant Examiner—Peter R. Brown
Attorney, Agent, or Firm—Jeffers, Irish & Hoffman

[57] ABSTRACT

Disclosed is a seat for vehicle which is pneumatically controlled for a desired body pressure distribution of a person seated in the seat, comprising: a plurality of air bags embedded in a seat; an air pressure source; a single first conduit connected the air pressure source at its one end and branched off into a plurality of second conduits leading to the air bags at its other end; a plurality of on-off valves each provided in the corresponding one of the second conduits leading to the air bags; an exhaust valve connected to the first conduit at its one end and to the atmosphere at its other end; a single pressure sensor provided in the first conduit; and control means connected to the air pressure source, the on-off valves, the exhaust valve and the pressure sensor; the control means comprising means for storing predetermined air pressure values for the air bags, means for selectively opening and closing the on-off valves and the exhaust valve, and means for preventing the valve opening and closing means for opening the valves according to the result of comparison between the output from the pressure sensor and predetermined air pressure values. Thus, the structure for air pressure control is simplified and the body pressure distribution of the passenger may be adapted to the acceleration of the vehicle and other conditions.

12 Claims, 9 Drawing Figures

PNEUMATICALLY CONTROLLED SEAT FOR VEHICLE

TECHNICAL FIELD

This invention generally relates to a pneumatically controlled seat for vehicle and in particular to such a seat having a number of air bags embedded therein in such a manner that the body pressure distribution of the seated person may be adjusted as desired by filling these air bags with air of appropriate pressures.

BACKGROUND OF THE INVENTION

Seats for vehicle having various adjustment functions may be generally classified into those having recliners, tilters and lifters for adjusting the posture of the seated person and those having thigh supports, side supports and lumber supports for adjusting the feeling and/or the body pressure distribution of the seated person. They are further classified into those which are manually adjusted and those adjusted by external force.

Specifically, this invention relates to a seat for vehicle which can adjust the feeling and the body pressure distribution of the seated person by external force and which can prevent the excessive increase in the air pressure due to temperature rise in the passenger compartment after the passenger has gotten off the vehicle.

Conventionally, such a seat for vehicle is typically provided with a power element, consisting, for example, of a motor and gears, for each adjustable portion of the seat and is controlled by mechanical adjustment mechanism, causing it to be heavy and complex and is therefore costly. It has been proposed to use air pressure as power means but such a system necessarily requires a pressure regulating valve for reducing the high air pressure of a pressure source to a level suitable for use and, since a pressure regulating valve requires a high level of precision for its manufacture and maintenance, tends to be costly and unreliable. Furthermore, as the number of the portions in the seat to be adjusted increases, the structure tends to be complex and the adjustment becomes increasingly cumbersome while the cost of manufacture becomes prohibitively high.

For instance, in Japanese patent application No. 59-9773 and Japanese Utility Model application No. 59-7311, the same applicant proposed pneumatically controlled seats for vehicle according to which the air pressures of the air bags are conveniently controlled by certain air control means. According to these pneumatically controlled seats, because the adjustment of the air pressure of each of the air bags may be quickly and readily accomplished, the comfort and the impression of the vehicle may be substantially improved by varying the body pressure distribution and the feeling of the seated person as desired. However, since they require either a plurality of pressure regulating valves or a variable pressure regulating valve, they tend to be expensive.

Furthermore, when air bags are used for achieving a desired contour of the seat or a desired body pressure distribution, the air bags must be protected from excessive inflation which may be caused by an excessive temperature rise in the passenger compartment as is often the case in a car which is parked for a long time in hot weather or by malfunction of a pressure control unit.

In view of such shortcomings of the prior art, a primary object of this invention is to provide a seat for vehicle according to which a plurality of air bags embedded in the seat may be filled with air of desired pressure without without requiring a pressure regulator valve.

Another object of this invention is to provide an improved pneumatically controlled seat for vehicle according to which the efforts involved in setting up the pressures of air bags embedded in the seat are substantially eliminated through automatization of the setting up of the air pressures of the air bags.

Yet another object of this invention is to provide an improved pneumatically controlled seat for vehicle according to which the body pressure distribution may be automatically and individually adjusted for each individual person.

Yet another object of this invention is to provide an improved pneumatically controlled seat for vehicle according to which the body pressure distribution of the seated person may be variably and automatically controlled according to the operating conditions of the vehicle so that the optimum body pressure distribution may be attained at all time.

Yet another object of this invention is to provide an improved pneumatically controlled seat for vehicle which is free from the problems of excessive inflation of the air bags.

SUMMARY OF THE INVENTION

According to this invention, such objects are accomplished by providing a seat for vehicle which is pneumatically controlled for a desired body pressure distribution of a person seated in the seat, comprising: a plurality of air bags embedded in a seat; an air pressure source; a single first conduit connected the air pressure source at its one end and branched off into a plurality of second conduits leading to the air bags at its other end; a plurality of on-off valves each provided in the corresponding one of the second conduits leading to the air bags; an exhaust valve connected to the first conduit at its one end and to the atmosphere at its other end; a single pressure sensor provided in the first conduit; and control means connected to the air pressure source, the on-off valves, the exhaust valve and the pressure sensor; the control means comprising means for storing predetermined air pressure values for the air bags, means for selectively opening and closing the on-off valves and the exhaust valve, and means for preventing the valve opening and closing means from opening the valves according to the result of comparison between the output from the pressure sensor and predetermined air pressure values.

Thus, according to this invention, it becomes possible to fill each of the air bags with air of desired pressure without using a special pressure regulator valve. Furthermore, since the pressure sensor for controlling the air pressure of each of the air bags is provided upstream of the on-off valve for each of the air bags and is common to all the air bags, only one such pressure sensor is necessary. And, by storing the upper limit of the air pressure for each of the air bags as one of the predetermined values, a relief valve or a safety valve for limiting the upper limit of the air pressure for each of the air bags may be omitted.

The invention may further include various sensors. As the sensing objects of the sensors, there are vehicle speed, acceleration, vibrations, steering angle, the state of the accelerator pedal, the state of the clutch pedal and so on, and, by controlling the air pressure of the air bags according to such sensor outputs and supporting the driver against lateral acceleration, longitudinal acceleration and the inclination of the vehicle, it is possible to improve the riding comfort for the passengers, to ensure accurate driving by the driver and to reduce the fatigue of the driver. Further, the excessive increase of the pressure in the air bags when the vehicle is parked during the warm season may be prevented.

According to a certain aspect of the present invention, the seat for a vehicle is additionally provided with a sensor for detecting the seating of a passenger in the seat and a sensor for detecting the getting on and off of the passenger into and out of the vehicle; and a program control unit for adjusting the air pressures of the air bags according to the outputs from the sensors.

According to another aspect of the present invention, the control means further comprises pressure varying means for changing the air pressures of the air bag in time sequence so that the optimum body pressure distribution may be achieved from cumulative data, the driver may be prevented from dozing off, or the driver may receive massage from the oscillating changes in the air pressures of the air bags.

BRIEF DESCRIPTION OF THE DRAWINGS

The present invention will now be shown and described in the following in terms of concrete embodiments thereof with reference to the appended drawings, in which.

DESCRIPTION OF THE PREFERRED EMBODIMENT(S)

Figure 1:
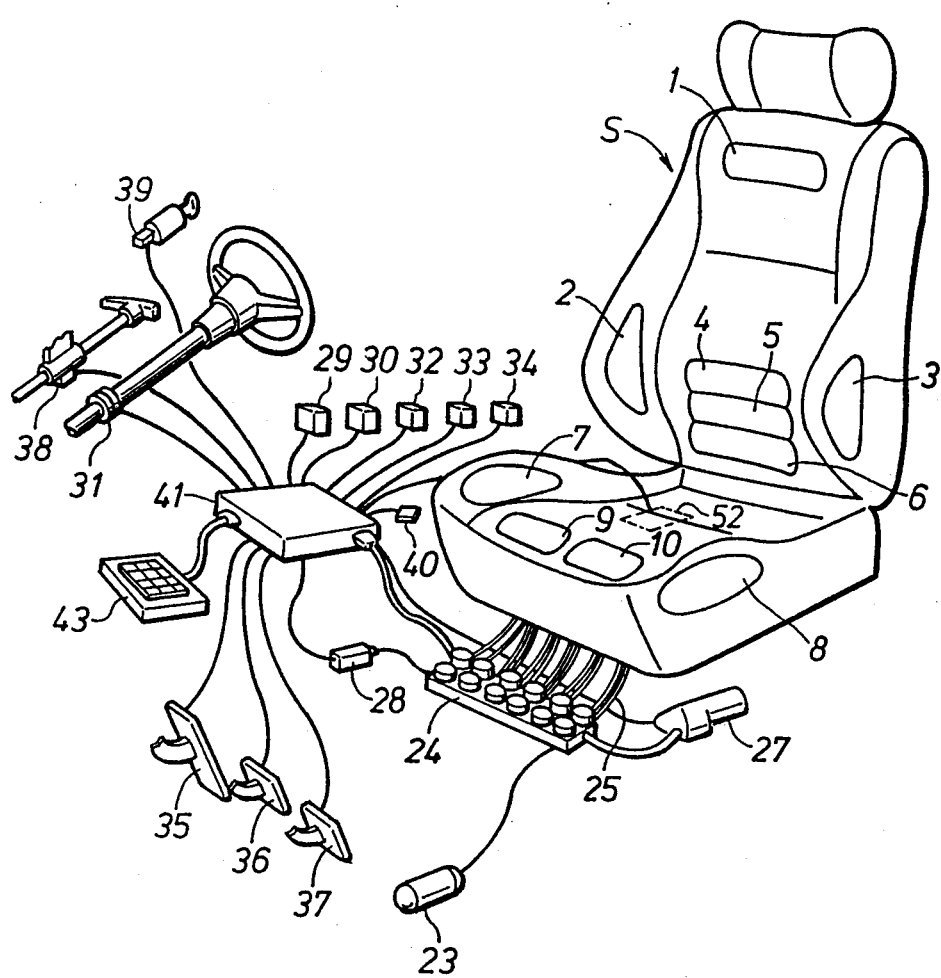
FIG. 1 is a perspective general view of the pneumatically controlled seat according to this invention.

FIG. 1 is a perspective view schematically illustrating a pneumatically controlled seat for vehicle S according to this invention. This seat for vehicle S is provided with a shoulder support 1 for an upper part of the seat back, right and left side support bags 2 and 3 also for the seat back, lumbar support bags 4 to 6, right and left side support bags 7 and 8 for the seat cushion, and right and left thigh support bags 9 and 10, all embedded therein, and each of the air bags is connected to a valve unit 24 by way of conduits 25.

The valve unit 24 is provided with a pressure sensor 28 and a motor-driven air pump unit 27, and the air pump unit 27, the valve unit 24 and the pressure sensor 28 are controlled by a control unit 41 having a keyboard 43 connected thereto. Further connected to the control unit 41 are a vibration sensor 29 which detects the vertical vibration of the vehicle, a vehicle speed sensor 30 which produces an output corresponding to the running speed of the vehicle, a steering sensor 31 which produces an analog signal corresponding to the steering action of the vehicle, a lateral acceleration sensor 32 which produces an output corresponding to the lateral acceleration of the vehicle, a longitudinal acceleration sensor 33 which produces an output corresponding to the longitudinal acceleration of the vehicle, an inclination sensor 34 which produces an output corresponding to the inclination of the vehicle, pedal sensors 35 to 37 which detects the states of the accelerator, the brake and the clutch pedals, a parking brake sensor 38 which detects the action of the parking brake, an ignition switch sensor 39 for detecting the action of the ignition switch, and a seating sensor 52 which detects the seating of a person in the seat.

Figure 2:
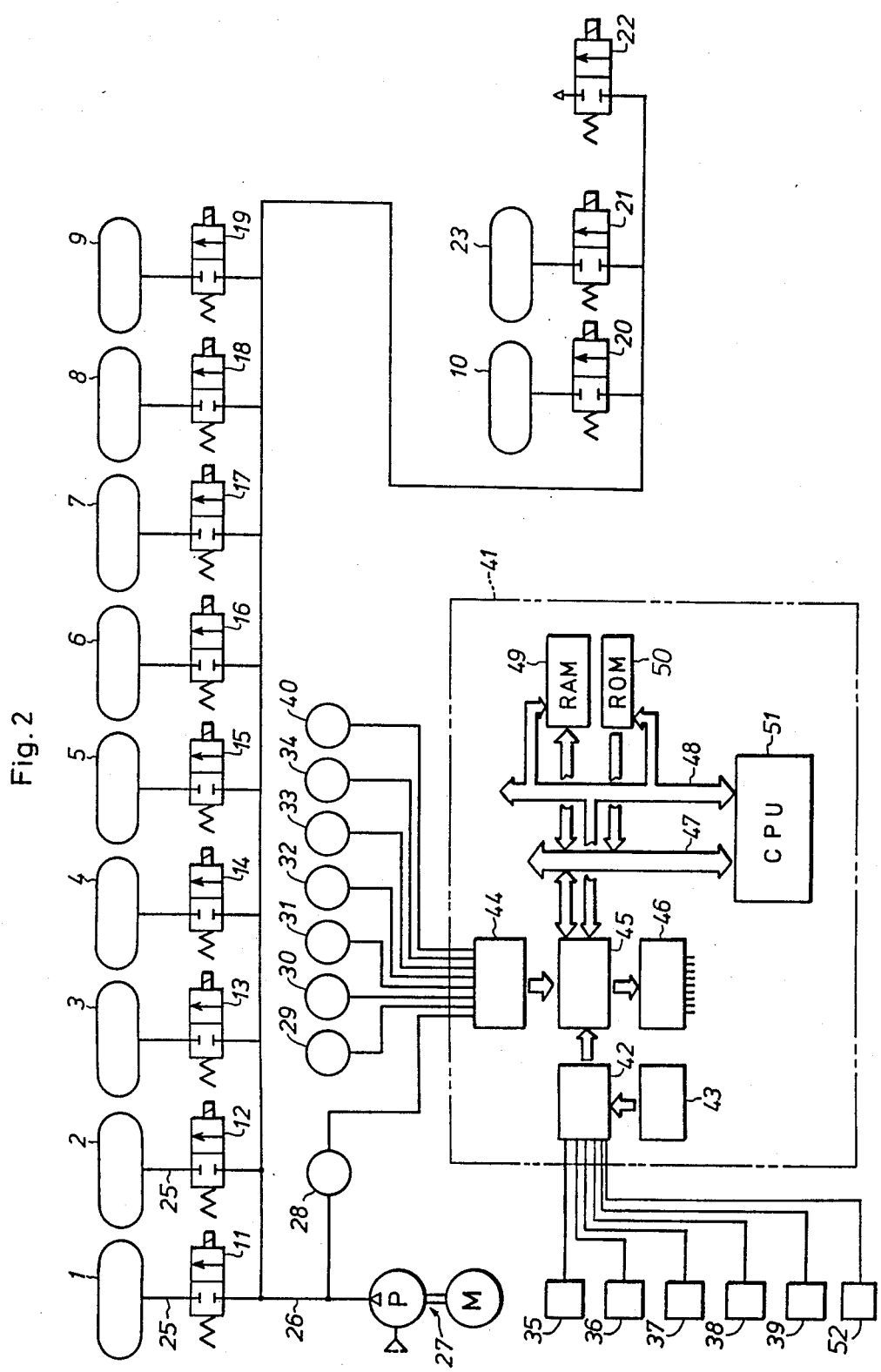
FIG. 2 is a diagram showing the structure of the embodiment of FIG. 1.

FIG. 2 is a diagram illustrating the structure of the embodiment of FIG. 1. The outlet of the air pump unit 27 is connected to a conduit 26 and each of the air bags 1 to 10 is connected to this conduit 26 in common by way of a corresponding two-port, two-position solenoid valve 11 to 20, which is normally biased to closed position by a spring, provided in a corresponding, separate conduit 25. Additionally, an accumulator 23 for storing the outlet pressure of the pump unit 27 is connected to the common conduit 26 by way of a similar solenoid valve 21. This conduit 26 is further connected to an exhaust valve 22 likewise consisting of two-port, two-position solenoid valve which is normally biased to closed position by a spring and communicated with the atmosphere at the other end.

The output end of a pressure sensor 28, which is disposed to detect the pressure of the common conduit 26, is connected to the control unit 41.

The control unit 41 is provided with a CPU 51 consisting of a micro processor, and RAM 49 and ROM 50 are connected to its data bus line 47 and address bus line 48. A pressure signal from the pressure sensor 28, a vibration signal from the vibration sensor 29, a vehicle speed signal from the vehicle speed sensor 30, a steering signal from the steering sensor 31, acceleration signals from the lateral acceleration sensor 32 and the longitudinal acceleration sensor 33, an inclination signal from the inclination sensor 34 and a temperature signal from a temperature sensor 40 are digitalized by an AD converter 44 and inputted to the CPU 51 by way of an I/O port 45. Since these inputs are switched over by the CPU 51 for sequential processing, only one AD converter is required.

Further, a command signal entered from the keyboard 43, pedal signals from the pedal sensors 35 to 37, a parking brake signal from the parking brake sensor 38, an ignition switch signal from the ignition switch sensor 39 and a seating signal from the seating sensor 52 are inputted to the CPU 51 by way of an input circuit 42 and an I/O port 45, and the CPU 51 activates the pump unit 27 and the solenoid valves 11 to 22 by way of a drive unit 46 according to these signals.

The analog sensors used in the above-embodiment need not be analog sensors but may also be digital sensors. When these sensors are digital sensors, then it goes without saying that they are inputted to the CPU 51 by way of the input circuit 51 and the I/O port 45 without passing through the AD converter.

Now the general action of the above described embodiment of the pneumatically controlled seat according to this invention is described in the following.

Figure 3:
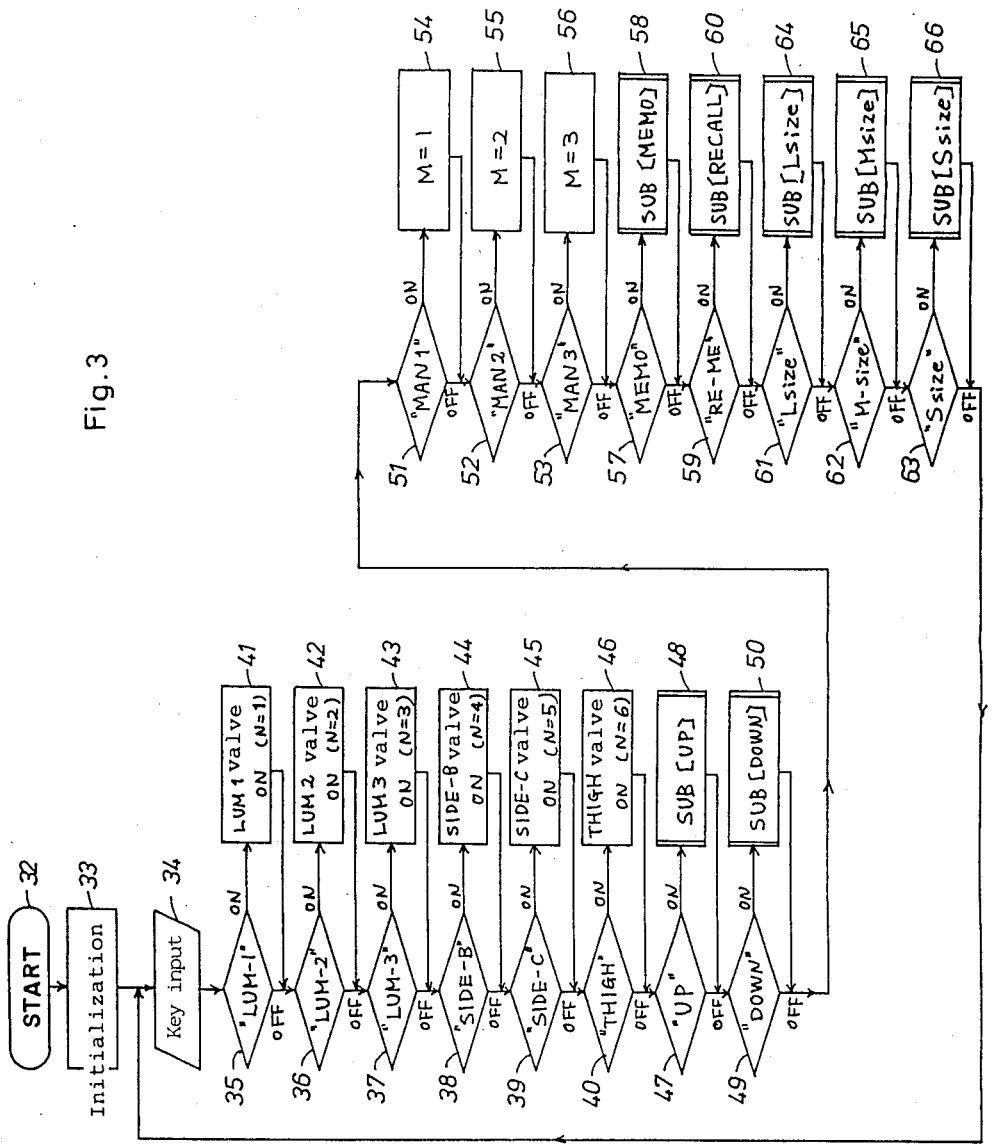
FIG. 3 is a flow chart showing the main routine in the CPU of the device shown in FIGS. 1 and 2.
Figure 9:
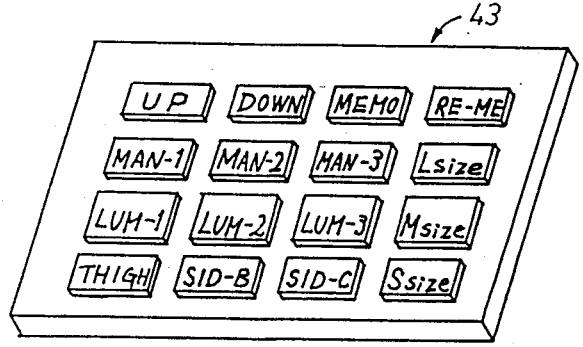
FIG. 9 is a perspective view showing the top of the keyboard of FIG. 1 in greater detail.

When either one of the air bags 1 to 10 is to be filled with air, the pump unit 27 is activated and the corresponding one of the solenoid valves 11 to 20 is opened at the same time so that the air bag of interest may be filled with pressurized air. In particular, any one of the air bags 1 to 10 is to be rapidly filled with pressurized air, by opening the solenoid valve 21 connected to the accumulator 23, the pressurized air stored in the accumulator 23 in advance may be rapidly filled into the air bag. When either one of the air bags 1 to 10 is to be depressurized, by opening the corresponding solenoid valve 11 to 20 and opening the exhaust valve 22 at the same time, the pressurized air in the air bag is released to the atmosphere and the pressure of the air bag is reduced. The high pressure air in the accumulator 23 is replenished by the pump unit 27 when no action of increasing or decreasing the pressure of the air bags is taking place By carrying out these procedures to each of the air bags, it is possible to set up the air pressures of all the air bags to desired values FIG. 3 is a flow chart illustrating the main routine which is programmed for the CPU 30. This main routine is cyclically repeated so as to detect whether any of the 16 keys (FIG. 9) of the keyboard 43 is pressed or not and comprises steps 35 to 40 for determining whether any of the keys each designating one of the air bags to be adjusted and steps 41 to 46 for producing a signal for opening one of the solenoid valves corresponding to the pressed key when it is detected that this particular key is pressed. For instance, "LUM1" key is pressed, the solenoid valve 14 corresponding to the lumbar support bag 4 is opened.

Figure 4:
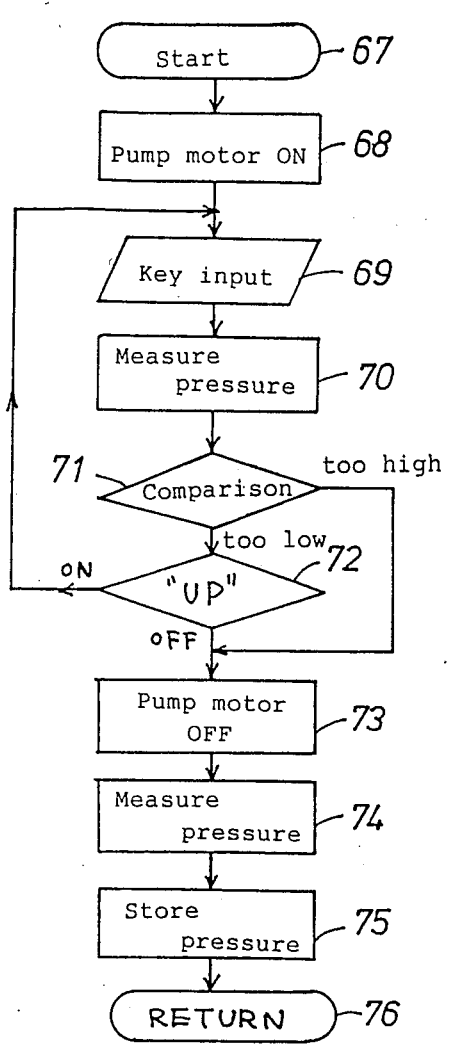
FIG. 4 is a flow chart showing the contents of the subroutine "UP" given in FIG. 3.

Further, when it is detected that "UP" key is pressed in step 47, a subroutine "UP" is started (step 48). According to this subroutine "UP", as shown in the flow chart of FIG. 4, upon start of this subroutine (step 67), the motor for the pump unit 27 is started (step 68). Then, the level of the air pressure supplied to the corresponding air bag is measured by the pressure sensor 28 in step 70. And this measured value 71 is compared with an upper limit or a safe pressure level stored in the ROM 50 and, if the measured value is lower than the upper limit, it is determined whether "UP" key is still being pressed in step 72. If "UP" key is still being pressed, the system flow returns to step 69 while the motor for the air pump unit 27 is continually activated so that the air may be continually supplied to the corresponding air bag. When either the measured air pressure value has reached the safety limit or "UP" key has been released, the motor for the air pump unit 27 is stopped in step 73. Then, the steady-state air pressure measured by the pressure sensor 28 is stored in the RAM 49 is step 75 and the system flow returns to the main routine from step 76.

Figure 5:
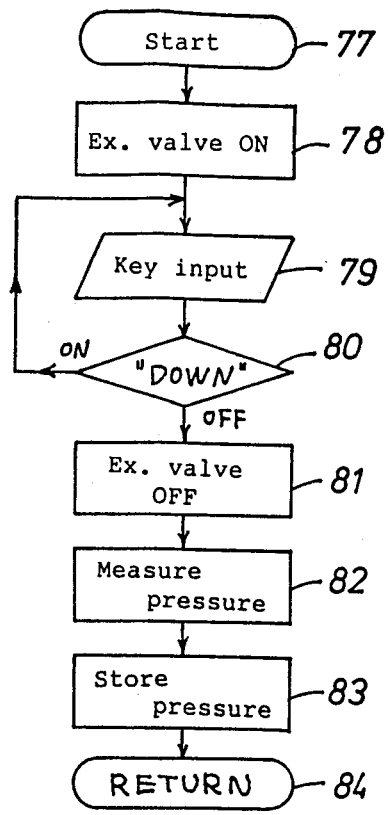
FIG. 5 is a flow chart showing the contents of the subroutine "DOWN" given in FIG. 3.

With reference to FIG. 3 again, if it is determined that "DOWN" key is being pressed in step 49, a subroutine "DOWN" is started (step 50). As shown in FIG. 5, upon start (step 77) of this subroutine "DOWN", the exhaust valve 22 is opened, thereby reducing the pressure in the air bag 2 to 9 which is connected to one of the solenoid valves 11 to 1 which is open at the moment. Similar to the previous case, as long as "DOWN" key is being pressed, steps 79 and 80 are repeated, keeping the exhaust valve 22 open. Once "DOWN" key is released, the exhaust valve 22 is closed in step 81. Then, the steady-state pressure value measured in step 82 by the pressure sensor 28 is stored in the RAM 49 in step 83, and the system flow returns to the main routine from step 84.

Figure 7:
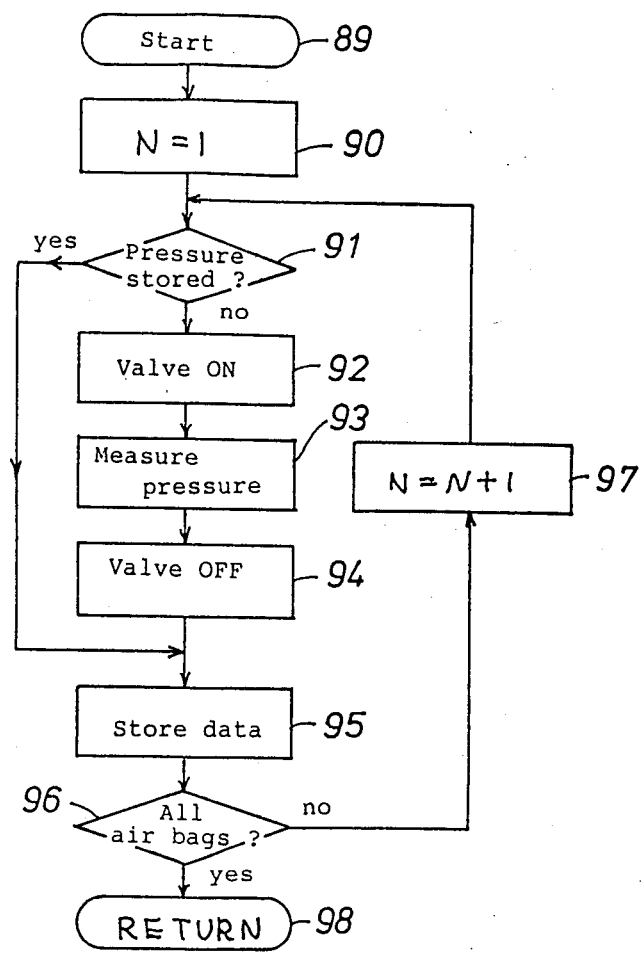
FIG. 7 is a flow chart showing the contents of the subroutine "MEMO" given in FIG. 3.

When the air pressure values of the air bags are manually adjusted to desired values, by pressing "MEMO" key (step 57 in FIG. 3) after designating one of the storage locations of the RAM 49 by pressing either one of "MAN1", "MAN2" and "MAN3" keys (steps 51 to 58 in FIG. 3), a subroutine "MEMO" is started and, as shown in FIG. 7, the pressure values which have thus been set up are stored in designated areas of the RAM 49. When the subroutine "MEMO" is thus started by pressing "MEMO" key (step 58), the following routine is performed for each of the air bags:

Upon start of this subroutine (step 89), an index N for designating either one of the air bags is initialized (step 90). The air pressure values of those air bags which have been adjusted are already stored in the RAM 49, but the air pressure values of the other air bags are not stored in the RAM. Therefore, in step 91, it is determined whether a temporarily stored air pressure value exists or not for each of the air bags and, when such a stored air pressure value does not exist, the solenoid valve corresponding to this particular air bag is opened (step 92) to lead out the air of this air bag to the conduit 26 and the pressure of the conduit is measured (step 93). Then, this solenoid valve is closed again (step 94) and the measured pressure value is stored in the RAM 49 (step 95). In this way, it is determined whether the pressure values of all the air bags are stored in the RAM 49 or not, and, if there is any air bag whose pressure value is not yet measured, its pressure value is measured as described above so that the pressure values of all the air bags are stored in the RAM 49 (steps 96 and 97). Then, the system flow returns to the main routine from step 98.

Figure 8:
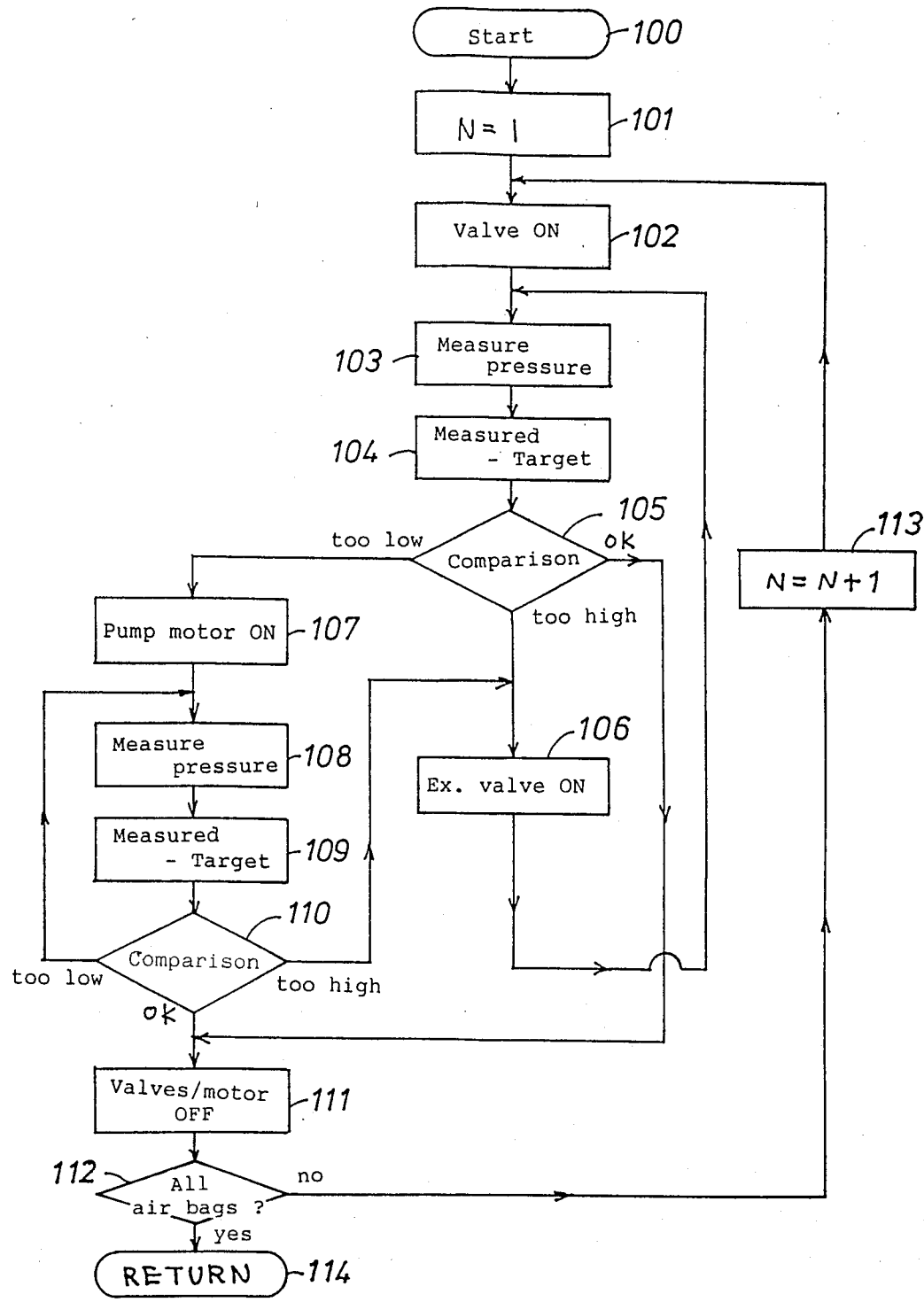
FIG. 8 is a flow chart showing the contents of the subroutine "RECALL" given in FIG. 3.

If the pressure values thus stored are desired to be reproduced, "RE-ME" key is pressed after pressing either one of "MAN1" to "MAN2" keys. In other words, by pressing "RE-ME" key (step 59), a subroutine "RECALL" is started (step 60). Then, as shown in FIG. 8, in the subroutine "RECALL" which is started in step 100, it is set that N=1 in step 101, and the solenoid valve of the corresponding air bag is opened (step 102). And, the pressure value of the conduit 26 is measured (step 103) and the difference between the measured value and a target value is derived (step 104). If it is determined in step 105 that the measured value is higher than the target value, the exhaust valve 22 is opened in step 106 and the routine starting from step 103 is repeated. If the measured value is lower than the target value, the pump motor is started in step 107 (at the same time as closing the exhaust valve 22) and the pressure is measured again (step 108) so that the difference between the measured value and the target value may be derived (step 109). When the desired pressure value has been obtained by either turning on the motor or opening the exhaust valve depending on a comparison result (step 110), the corresponding solenoid valve is closed in step 111 and the motor is turned off. It is determined in step 112 whether this routine has been conducted for all of the air bags or not in step 112, and, if there is any air bag for which this routine has not been conducted, it is set that N=N+1 and the routine from step 102 is repeated. Once it is determined that the agreement between the target pressure value and the measured pressure value has been obtained within a certain tolerance for every one of the air bags, the system flow returns to the main routine from step 114.

Figure 6:
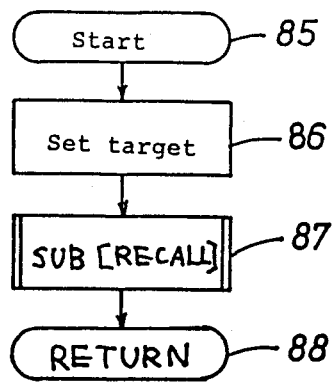
FIG. 6 are flow charts showing the contents of the subroutines "L-SIZE", "M-SIZE" and "S-SIZE" given in FIG. 3.

The pressure values which are set up in association with "MAN1" to "MAN3" keys are stored in the RAM 49 and it is desirable to store in advance a set of typical pressure values in the ROM 50. For instance, combinations of typical pressure values for the air bags are stored in the ROM 50 is association with "L-SIZE", "M-SIZE" and "S-SIZE" keys and each combination of the pressure values may be reproduced by pressing the corresponding key. In other words, when it is determined in either one of steps 61 to 63 in the main routine that either one of the keys is pressed, a corresponding subroutine "L-SIZE", "M-SIZE" or "S-SIZE" is started and, according to the routine shown in FIG. 6, the pressure values stored in the ROM 50 is read out in step 86 and the subroutine "RECALL" is started in step 87 according to the pressure values which have been thus read out. When the desired pressure values have been obtained in this way, the system flow returns to the main routine from step 88. In this way, by pressing each of the keys of the keyboard shown in FIG. 9, the air pressure value of each of the air bags may be adjusted to a desired value. In other words, by pressing the key corresponding to the air bag of interest and then pressing either "UP" key or "DOWN" key, the air pressure value of the air bag may be adjusted to a desired value and the combination of the desired pressure values may be stored as a combination of the air pressure values by pressing either one of "MAN1", "MAN2" and "MAN3" keys. Further, by permanently incorporating typical combinations of pressure values in the control unit in association with "L-SIZE", "M-SIZE" and "S-SIZE" keys, the trouble of setting up desired pressure values may be simplified.

The above-described action of pressurization and depressurization is accomplished by the CPU 51 sequentially activating the pump unit 27 and/or the solenoid valves 11 to 22 by way of the drive circuit 46 according to the output from the pressure sensor 28 provided in the conduit 26 and the given program. The air pressures to which the air bags are to be filled with air may be manually set up from the keyboard 43, but it is also possible to determined the air pressures of the air bags according to the predetermined values stored in the RAM 49 and the ROM 50. If desired, it is possible to store the sequential changes of the air pressures at which the air bags are to be filled with air in the RAM 49 and the ROM 50 and to change the air pressures of the air bags in time sequence.

Now the specific actions of the present invention under various conditions are described in the following.

Generally speaking, it is possible to improve the riding comfort of a vehicle by changing the softness of the seat according to the magnitude of the irregularities of the road surface. In this embodiment, an acceleration signal representative of the vertical vibration of the vehicle is obtained by a vibration sensor 29 mounted to the vehicle body and, after converting this signal into a digital signal by the AD converter 44, the CPU 51 classifies the digitalized acceleration data into three levels so that the frequencies of the occurrence of these levels in the acceleration are accumulated over certain time intervals. The road condition is judged from these cumulative frequencies and the air pressures of the air bags are automatically adjusted according to the road condition in comparison with a certain reference stored in the ROM 50.

Since a lateral acceleration acts upon the driver when the vehicle is turning, it is desirable to support the driver against such a lateral acceleration. According to this embodiment, a signal corresponding to the steering angle is produced from the steering sensor 31 provided in the steering column. Additionally, the vehicle speed signal is supplied from the vehicle speed sensor 30 to the CPU 51 and the lateral acceleration which will act upon the driver is predicted by the CPU 51 according to the relationship between the steering angle and the vehicle speed so that the air bags may be filled with air of pressures according to the magnitude of the predicted lateral acceleration so as to best support the driver against it. For instance, when it is predicted that the lateral acceleration which will act upon the drive exceeds a certain value according to the relationship between the steering angle and the vehicle speed, it is recommended to rapidly fill with pressurized air either one of the side support bags 7 and 8 which will oppose such an acceleration. In such a case, the air is supplied from the high pressure air in the accumulator 23 and it is accomplished by opening the solenoid valve 21. The high pressure air in the accumulator 23 is replenished by the pump unit 27 while the air pressure is not being increased or decreased.

The vehicle body is provided with the longitudinal acceleration sensor 33 and, when a longitudinal acceleration is acting on the vehicle for instance because the vehicle is running on an up slope or a down slope, it can detect the resulting longitudinal acceleration. By filling for instance selected on of the side support bags 7 and 8, the thigh support bags 9 and 10 and the shoulder support bag 1 with pressurized air in a suitable manner according to the detected longitudinal acceleration, the driver is supported against the longitudinal acceleration acting upon the driver and his driving accuracy may be improved.

When the vehicle is running in an inclined manner because of such a road condition, it is desirable to support the driver against such an inclination. According to this embodiment, the inclination sensor 34 attached to the vehicle produces an inclination signal and either ones of the side support bags 2 and 7 or 3 and 8 may be filled with pressurized air so as to cancel such an inclination according to the inclination signal, for instance, when the inclination of the vehicle has exceeded a certain value.

When the vehicle is running slowly because of the congestion of the road, the accelerator, the brake and the clutch pedals are frequently used by the driver and, combined with the efforts involved in steering action, the driver often suffers from fatigue. The speed sensor 30 sends a vehicle speed signal to the CPU 51 and, by detecting the pedal actions from the pedal sensors 35 to 37 in relation with the vehicle speed, it is possible to determine the slow running condition of the vehicle due to the congestion of the road. If such a state is detected, by reducing the air pressures of for instance the thigh supports 9 and 10 and the side supports 2, 3, 7 and 8 while increasing the air pressures of the lumbar supports 4 to 6 in a cyclic manner, the body pressure distribution of the driver is varied and his fatigue may be reduced.

In order that the body pressure distribution of the passenger may be adjusted by filling air into a plurality of air bags, the passenger must be seated in the seat. Therefore, according to this embodiment, a pressure sensor as the seating sensor 52 is provided under the group of the air bags in the seat cushion and its output is supplied to the CPU 12 by way of the input circuit 42 and the I/O port 45. This seating sensor 52 may consist of an enclosed air bag and a pressure switch placed therein. This air bag may be either one of the lumbar support bags 4 to 6 itself or a separate air bag dedicated to sensing the seating of a passenger in the seat.

The adjustment of the air pressure in the air bags 1 to 10 may be performed only once when the passenger is seated in the seat, or, alternatively, may be repeated at a certain interval, for instance once every ten minutes. Alternatively, the above described action may be continually repeated all the while the passenger is seated in the seat so that the body pressure distribution may always adapt itself to the sitting posture of the passenger.

As means for detecting the seating of a person in the seat, the seating sensor 52 may be replaced by a sensor or sensors which detect certain conditions which will be indicative of the presence or absence of a person sitting in the seat; for instance such sensors may consist of (1) sensors which detect whether three conditions consisting of closing and opening of the door, turning on of the ignition switch and increase in the air pressure of an air bag embedded in the seat are satisfied or not; (2) sensors which detect whether two conditions two conditions consisting of turning on of the ignition switch and releasing of the parking brake are satisfied or not; or (3) sensors which detect whether two conditions consisting of turning on of the ignition switch and releasing of the parking brake are satisfied or not and, additionally, whether a certain time interval has elapsed since then or not.

According to such embodiments, since the air pressures of the air bags are adjusted upon detection of the seating of a passenger in the seat, there is no need for the passenger to manually adjust the air pressures of the air bags and a body pressure distribution which is adapted to each individual is achieved automatically, whereby the efforts required from the passenger for the adjustment are substantially relieved and seating comfort is always provided to the passenger for reduction of his fatigue and improved comfort and impression of the vehicle.

It is known that if the windows of a parked car are closed in summer the temperature of the passenger compartment may rise to an extremely high level, and if the seat is properly adjusted or the air pressures of the air bags are kept high after the passenger has left the car, the air pressures of the air bags may increase so much that the piping and so on may be adversely affected due to the excessive rise in the temperature of the passenger compartment.

Therefore, according to this invention, for instance, when the off state of the ignition switch is detected by the ignition switch sensor 39 and/or when a sudden drop in the pressure of a certain air bag is detected by the pressure sensor 28 and it is also detected from the mount of the internal clock pulses that this state has persisted for more than a certain time period, the CPU 51 judges that the passenger has left the car and the excessive rise in the pressures of the air bags may be prevented by reducing the air pressures of the air bags below a certain level for instance down to the atmospheric pressure. In this case, the evacuation of the air from the air bags may be carried out either by measuring, one by one, the air pressure of each air bags in a sequential manner or all at once by simultaneously opening all the solenoid valves for the air bags. Further, for detection of the absence or the presence of the passenger may be detected from the conditions that the parking brake is being used and that the off state of the ignition switch has persisted for more than a certain time interval.

It is also possible to reduce the air pressures of the air bags when the temperature of the passenger compartment detected by the temperature sensor 40 has exceeded a certain level.

This invention may also be applied to preventing a driver from dozing off. Generally speaking, even when the vehicle is running straight, steering action is incessantly carried out because of external interferences from the road surface and errors in the setting of the vehicle. Therefore, if there is no steering action or almost no steering action for a certain time interval, it is likely the driver is dozing off. When it is thus judged that the driver is dozing off, the driver may be awakened by periodically increasing and decreasing the air pressure of at least a portion of the air bags, for instance, the lumbar support or the shoulder support, according to a sequence stored in the CPU 51 or the ROM 50.

When it is judged that the driver has woken up from slumber from the resumption of steering action, the periodic change of the air pressure is terminated and the air bags are restored to the original states. The periodic change in the air pressure of the air bag is accomplished by opening and closing the solenoid valve corresponding to the air bag and the exhaust valve in an alternating manner.

The CPU 51 is provided with an internal clock and can detects the lapsed time such as the driving time of the driver by counting the output of the internal clock. When a parking brake is used, the output from the parking brake sensor 33 interrupts the counting of the clock output. By varying the air pressures to be filled into the air bags in a certain pattern according to the thus detected driving time, for instance every 30 minutes, the body pressure distribution of the driver may be varied and the fatigue of the driver may be reduced.

Such sequential variations of pressure values may be set up from the keyboard 43, but, since it is not readily possible to obtain optimum settings, it is desirable to sample the manual settings of the driver over a certain time span so that the average values of the samples may be reproduced automatically.

Periodically varying a specific air bag for preventing the driver from dozing off was described above, but it is also possible to perform it manually from the keyboard and to periodically change the air pressures of all the air bags to the desire of the driver. In this case, the period of the change in the air pressure may be a long one, but, by using a relatively short period or high frequency, it is possible to effectively reduce the fatigue of the driver by applying massage to him.

It may be achieved not only by activating the air pump and opening and closing the solenoids 11 to 20 and the exhaust valve 22 in an alternating manner, but also by providing a piston supported by a spring in the conduit 26 and driving it for instance by electromagnetic force.

Thus, according to this invention, since the body pressure distribution of the driver may be controlled according various driving conditions, it is possible to achieve a fine setting of body pressure distribution and to improve the riding comfort for the passenger, whereby not only the comfort of the seat is improved but also the safety of the driving may be increased. Moreover, because the air pressures of the air bags are reduced when the passengers have gotten off from the seat for the purpose of preventing the excessive increase in the air pressures due to temperature rise of the passenger compartment while the vehicle is being parked, the present invention may provide the additional advantage that the passenger will feel easier when he sits on the seat next time because the air pressures of the various parts of the seat are reduced.

Thus, according to this invention, each of the air bags may be filled with air of desired pressure according to the program of the CPU without using a special pressure regulator valve. Moreover, because only one pressure sensor is necessary, not only the cost for component parts may be reduced but also the pressure control system is simplified. Therefore, the reliability of the device is enhanced and the cost for manufacture is reduced through simplification of the structure. Furthermore, by setting up the upper limit of the pressure values permitted for each of the air bags as part of the program, over-pressurization of the air bags may be effectively prevented without using a relief valve or the like.

Although the present invention has been shown and described with reference to the preferred embodiment thereof, and in terms of the illustrative drawings, it should not be considered as limited thereby. Various possible modifications and alterations could be conceived of by one skilled in the art to any particular embodiment, without departing from the scope of the invention. Therefore it is desired that the scope of the present invention should be defined not by any of the perhaps purely fortuitous details of the shown preferred embodiment, or of the drawings, but solely by the scope of the appended claims, which follow.

What we claim is:

1. A seat for a vehicle which is pneumatically controlled for a desired body pressure distribution of a person seated in the seat, comprising:
    a plurality of air bags embedded in a seat;
    an air pressure source;
    a single first conduit connected to the air pressure source at its one end and branched off into a plurality of second conduits leading to the air bags at its other end;
    a plurality of on-off valves provided in each of the respective corresponding second conduits leading to the air bags;
    a single only exhaust valve connected to the first conduit at its on end and to the atmosphere at its other end;
    a single only pressure sensor provided in the first conduit; and
    control means connected to the air pressure source, the on-off valves, the exhaust valve and the pressure sensor, the control means comprising means for storing predetermined air pressure values for the air bags, means for selectively opening and closing the on-off valves and the exhaust valve, and means for preventing the valve opening and closing means from opening the valves according to the result of comparison between the output from the pressure sensor and predetermined air pressure values whereby each of the air bags may be pressurized or depressurized by activiation of the air pressure source or the exhaust valve according to the pressure value determined by the single pressure sensor through sequential activation of the on-off valves for sequential selection of the air bags which are to be pressure controlled.

2. A seat for a vehicle as defined in claim 1, wherein the predetermined values include the upper limit of the air pressure values for each of the air bags.

3. A seat for a vehicle as defined in claim 1 or 2, wherein the seat further comprises a sensor for detecting the presence of a person sitting in the seat.

4. A seat for a vehicle as defined in claim 3, wherein the sensor consists of a pressure switch placed in a bag embedded in the seat.

5. A seat for a vehicle as defined in claim 3, wherein the sensor is a pedal sensor which detects the absence of the action of an accelerator, brake and/or clutch pedal.

6. A seat for a vehicle as defined in claim 2 and further comprising an acceleration sensor for detecting the acceleration of the vehicle, said acceleration sensor connected to the control means for selective control of the air pressures of the plurality of air bags so as to support a person being seated in the seat against the acceleration of the vehicle.

7. A seat for a vehicle as defined in claim 1, wherein the control means further comprises pressure varying means for changing the air pressures of the air bag in time sequence.

8. A seat for a vehicle as defined in claim 7, wherein the pressure varying means changes the air pressures of the air bags in a cyclic manner.

9. A seat for a vehicle as defined in claim 8, wherein the pressure varying means changes the air pressures of the air bags according to a sequence stored in the control means.

10. A seat for a vehicle as defined in claim 7, wherein the control means includes a sensor for detecting the absence of steering action and means for activating the pressure varying means in the absence of steering action for more than a certain time interval.

11. A seat for a vehicle as defined in claim 1, wherein the pressure varying means changes the air pressures of the air bags according to cumulative data of manual settings made by a person sitting in the seat.

12. A seat for a vehicle as defined in claim 1, wherein the control means comprises memory means for storing at least one combination of air pressures for the air bags and means for reproducing these air pressures in the corresponding air bags.

* * * * *

UNITED STATES PATENT AND TRADEMARK OFFICE
CERTIFICATE OF CORRECTION

PATENT NO.   :   4,655,505

DATED        :   April 7, 1987

INVENTOR(S)  :   Takayoshi Kashiwamura

It is certified that error appears in the above-identified patent and that said Letters Patent is hereby corrected as shown below:

```
Col. 5, line 62, change "1" to --21--;
Col. 9, line 55, change "mount" to --count--;
Claim 1, Col. 11, line 47, change "on" to --one--;
Claim 1, Col. 12, line 6, change "activiation" to --activation--
```

Signed and Sealed this

Eighteenth Day of August, 1987

*Attest:*

DONALD J. QUIGG

*Attesting Officer*   Commissioner of Patents and Trademarks